Feb. 13, 1940.  E. BUGATTI  2,190,398
REEL FOR FISHING
Filed Aug. 23, 1937
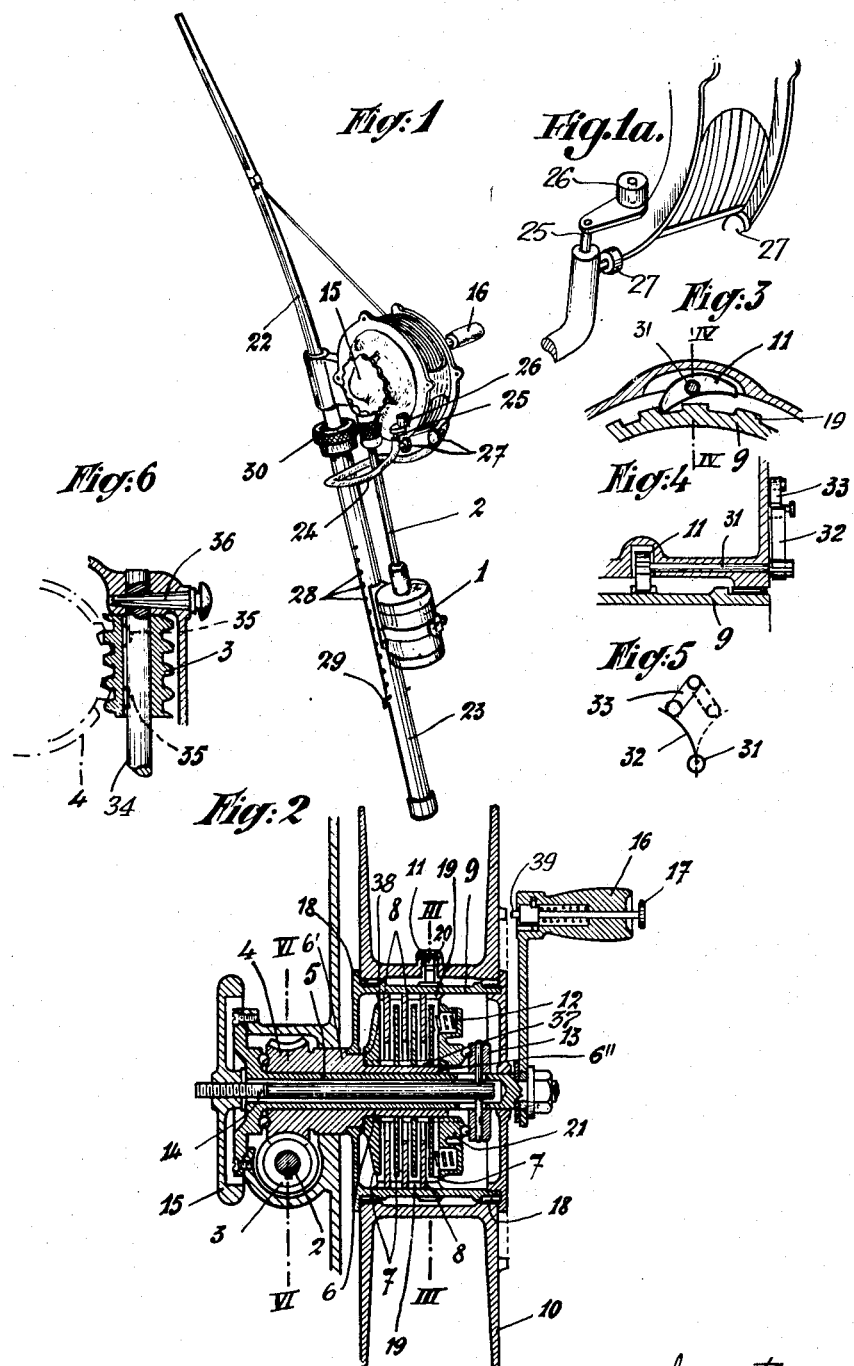
Inventor:-
Ettore Bugatti
By Mauro & Lewis,
Attorneys

UNITED STATES PATENT OFFICE 2,190,398

REEL FOR FISHING

Ettore Bugatti, Molsheim, Bas-Rhin, France

Application August 23, 1937, Serial No. 160,552
In France October 31, 1936

3 Claims. (Cl. 43—21)

Catching big fish with a fishing rod makes it necessary to provide implements complying with severe requirements both from the point of view of strength and from that of the function to be performed. The length of the line ranges from 300 to 600 yards, in order to make it possible, at a given time, to let run the fish that has been hooked and which sometimes weighs several hundreds of kilograms. Some fishes, such as sharks, are capable of a speed of 75 miles per hour, as it has been scientifically ascertained, and it will be readily understood that nothing can withstand so quick a dash of the fish that has been hooked. Of course, this kind of fishing is practiced on a small boat which is rather fast. But it is difficult to run such boats at a speed higher than 15 to 18 miles per hour, and it must be endeavoured to follow the fish so as to try to keep a portion of the line wound on the reel, since otherwise it would be necessary to have a length of line of several miles and the fishing tackle would become impossible to handle under such conditions.

The catching of a relatively big fish lasts for several hours, and, despite all that has been done up to the present time, this work soon becomes exhausting to the fisherman and it lasts certainly much longer than it would be necessary if the fish, after having been hooked, were played, or tired out, in a systematic manner.

The general object of the present invention is to provide an improved reel for a fishing rod, which permits the line to be wound in quickly, and provides an adjustable braking torque for the line when it is being unreeled by the run of a fish, thereby reducing the efforts of the fisherman in either instance.

The essential feature of the reel according to the present invention lies in the fact that the drum on which the line is wound is provided with driving means connected to a source of motive power, said means including an adjustable coupling device adapted to permit a slipping of the control element and the driven element with respect to each other when the resisting torque exceeds the driving torque.

Preferably, the coupling device is a friction coupling device, for instance a clutch, the cooperating plates or discs of which can be pushed more or less strongly against one another by means of an adjusting device. This coupling device is preferably located in the hub of the drum which receives the line and the drum is rotatably mounted on its hub. A unidirectional driving device, such as a pawl mechanism or a free wheel mechanism is interposed between the drum and the hub.

The reel is further provided with a crank handle capable of being coupled with the drum in the known manner, for operating the reel in the same manner as an ordinary reel.

The source of driving power may be of any kind whatever, but I prefer an electric motor of small size adapted to be fitted on a fishing rod.

The present invention further inclosed, in addition to the reel above described in a general manner, a special end piece for a fishing rod. This end piece includes a tubular part or a connection member for securing said end piece to the butt end of a fishing rod; means for the attachment of a motor, for instance a collar surrounding said motor; and finally means for holding the reel against side movements. By means of such an end piece, it is extremely easy to make the change from a power-driven reel to a hand reel, and vice versa.

When use is made of the reel according to the present invention, as soon as the fish has been hooked, the motor is started and the clutch is adjusted in such manner that it exerts the amount of friction considered as usual. The motor thus tends to wind up the line on the drum and it will do so as long as the resistance opposed by the fish is not too high. If, for instance, use is made of a line such as hemp lines of a diameter ranging from 0.8 to 0.135 inch, the breaking strength of which is 220 pounds, and if the clutch is adjusted in such manner as to slip only when the traction is higher than 110 pounds, a big fish is very quickly drawn in to the desired distance, while it is compelled to display maximum effort in trying to escape and is thus systematically tired; there is also no risk of breaking the line and it is only necessary to have a relatively short portion of the line unwound from the drum or spool. Accordingly very strong, i. e., heavy, lines may be used since they need not have a considerable length.

Furthermore, when the fish is moving toward the boat, the motor winds in the line more quickly than could be done with the hand operated crank, and this while keeping the line taut, that is to say in such manner as to avoid any risk of the fish unhooking itself or breaking the line by suddenly changing its direction.

Other features of the present invention will result from the following detailed description of some specific embodiments thereof.

Preferred embodiments of the present invention will be hereinafter described with reference to the accompanying drawing, given merely by way of example, and in which:

Fig. 1 is a perspective view of a fishing rod fitted with the reel according to the present invention and mounted on the special end piece above referred to;

Fig. 1a shows a detail of the same on an enlarged scale;

Fig. 2 is an axial section of the reel, this view showing only a portion of the casing;

Fig. 3 is a sectional view on the line III—III of Fig. 2, showing a detail of the reel;

Fig. 4 is a section on the line IV—IV of Fig. 3;

Fig. 5 is a side view corresponding to Fig. 4;

Fig. 6 is a partial sectional view on the line VI—VI of Fig. 2.

The reel shown in the drawing receives its movement from an electric motor 1 through a Cardan shaft (Fig. 1) which is connected in a removable manner to the control spindle 34 (Fig. 6) of a worm 3. The latter meshes with a wheel 4 mounted loose on the spindle 5. Integral with the wheel 4, on one side thereof, is a hub, generally denoted by reference character 6, including a portion 6' of large diameter and a tubular portion 6" having a small diameter; the tubular portion 6" being formed with peripheral teeth or splines 37 for holding against rotation the male discs 7 of a friction clutch, while allowing axial movement of the same along said tubular hub portion; the outermost left-hand disc has its axial movement limited by the face 38 of the hub portion 6' which constitutes an abutment for said disc. The female discs 8 of the friction clutch are positioned in alternate relationship with the male discs 7 in a casing 9 to which they are connected through splines or teeth 19 allowing for axial movement of the discs 8 with respect to the casing 9 while preventing relative rotation. Casing 9, which constitutes the hub of the drum of the reel is mounted losely on shaft 5 and the hub of gear 4. It is coupled with the drum 10 of the reel by a pawl 11 which may be caused to work in either direction. For this purpose, as shown in Figs. 3 to 5 pawl 11 is connected to a transverse spindle 31, the outer end of which carries a spring blade 32. A small lever 33 permits blade 32 to be set either in the position shown in solid lines in Fig. 5 or in the position shown in dotted lines. The corresponding positions of the pawl are the position of Fig. 3 and the opposite position (not shown). Owing to the flexibility of blade 32, the pawl is capable of working while being urged toward the desired position.

It is possible to adjust the clutch by tightening to the desired extent springs 12, through the intermediate of sleeve 13 acting upon plate 21, sleeve 13 being adjusted by the threaded rod 14 and handle 15. It will be realized that the pile of alternate discs 7 and 8 is thus shifted to the left, the outermost disc 7 on the left being in abutment with the face 38 of the hub portion 6', so that the various discs have frictional engagement with the adjacent ones under a pressure dependent upon the adjustment of the plate 21.

In order to utilize this reel as an ordinary reel, I may, after having stopped the electric motor 1, interconnect crank 16 and drum 10 together by means of the push-piece 39 operated by knob 17. Drum 10 then turns freely in one direction determined by the position given to pawl 11 about casing 9 from which it is separated by small rollers 18.

The friction clutch is constructed in such manner that it is able to slip for a very long time without heating and without impairing the regularity of the transmission of the rotary movement. Due to the selective adjustment of the pressure afforded by means of springs 12, it is therefore possible to adjust the speed of winding of the line with a high precision despite the resistance opposed by the fish. For a given adjustment, the winding speed varies according to the resistance in question and, in the case in which this resistance does not overcome the driving effort, from zero up to a maximum, the reel is driven at a speed which it would be practically impossible to obtain by manually operating crank 16.

It follows, with reference to Fig. 1, that the reel can be fitted separately, that is to say without motor 1 and shaft 2, on a fishing rod 22 to which it is connected through a suitable fastening arrangement and it can then be utilized as an ordinary hand operated reel. If the connection between screw 3 and wheel 4 is irreversible, wheel 4 is locked angularly even though wheel 3 is not connected to shaft 2, and motor 1, and the clutch acts in this case as an adjustable brake. However, it is preferable and, if the connection between screw 3 and wheel is reversible, it is necessary to provide means for angularly locking screw 3. For this purpose, screw 3 can be connected to its control spindle 34 through one or several keys 35 and the reel is provided with a fixation pin 36.

When the device is to be utilized as a power driven reel, the bottom end of the fishing rod 22 is introduced and secured into an end piece 23 carrying a stirrup-shaped member 24 between the branches of which the reel is engaged. Preferably the ends of said branches are hollow and receive rods 25 carrying freely rotatable rollers 26 in eccentric position, the amount by which the rods are driven into the hollow branches and their angular positions being adjustable by means of screws 27. Rollers 26 firmly hold the reel on both of its faces. Holes 28 are provided in end piece 23 for receiving a pin 29 acting as an abutment for the end of fishing rod 22, which may be tightly held in a collar 30 carried by end piece 23.

The electric motor is supplied with current through a conductor (not shown in the drawing) which preferably is provided with a switch located within reach of the hand of the person using the fishing rod. The current may be supplied, for instances, by storage batteries mounted on board the boat.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. For use with a fishing rod having a reel provided with a spool-driving member, the combination of a rod support including a tubular portion to detachably accommodate therein the butt end of the rod; a motor mounted on the support; and coupling means for operatively connecting the reel spool driving member with the motor.

2. For use with a fishing rod having a reel provided with a spool driving member, a rod supporting and spool driving device forming a unit in itself, which comprises a tubular casing for detachably accommodating therein the butt end of said rod, a motor carried by said casing, and coupling means for operatively connecting said spool driving member and said motor, said coupling means being permanently connected with said member and adapted for detachable connection with said spool driving member.

3. For use with a fishing rod having a reel provided with a spool driving member, a rod supporting and spool driving device forming a unit in itself, which comprises, in combination, a tubular casing for detachably accommodating therein the butt end of said rod, a stirrup-shaped member rigidly carried by said casing adapted to catch said spool between its branches, a motor carried by said casing, and coupling means for operatively connecting said spool driving member and said motor, said coupling means being permanently connected with said motor and adapted for detachable connection with said spool driving member.

ETTORE BUGATTI.